3,781,298
PREPARATION OF 2-PYRROLIDINONE
Ronald I. Davis, Wilmington, Del., assignor to Sun Research and Development Co., Philadelphia, Pa.
No Drawing. Filed Nov. 1, 1971, Ser. No. 194,685
Int. Cl. C07d 27/08
U.S. Cl. 260—326.5 FN       3 Claims

ABSTRACT OF THE DISCLOSURE

A process for preparing 2-pyrrolidinone which comprises reacting succinonitrile in aqueous solution and in the absence of added ammonia with hydrogen in the presence of a Raney cobalt catalyst, at a temperature of from about 250° C. to about 300° C. and at a hydrogen pressure of from about 2000 to about 3500 p.s.i.g.

---

It is known from the disclosure of U.S. 3,095,423 (Copenhaver, assigned to Minnesota Mining and Manufacturing Co., issued June 25, 1963) that 2-pyrrolidinone (hereinafter referred to as 2–P) may be prepared by reacting an aqueous solution of succinonitrile, preferably an aqueous ammonia solution, at elevated temperatures (20° to 200° C., preferably 80° to 160° C.) and elevated pressures in the presence of hydrogen and a catalyst such as ruthenium oxide, platinum oxide, supported noble metal catalysts such as platinum and palladium on carbon or alumina, Raney nickel, Raney cobalt and the like. This patent disclosure achieves yields on the order of 25% 2–P at about 150° C., and teaches that "lowering the reaction temperature brings about substantial increases in yield."

It has now been found that when preparing 2–P by hydrogenating an aqueous solution of succinonitrile with a Raney cobalt catalyst, a significant increase in yield is obtained at higher temperatures, and in accord with this invention an improved process for 2–P is achieved by hydrogenating an aqueous solution of succinonitrile free of any added ammonia in the presence of a Raney cobalt catalyst at a temperature of from about 250° to about 300° C. and at a hydrogen pressure of from about 2000 to about 3500 p.s.i.g.

In carrying out the process, succinonitrile and catalyst are charged to a reaction chamber which is then closed and further charged with hydrogen to a pressure of about 500 p.s.i.g. The temperature of the reaction mass is then raised to a temperature between about 250° and about 300° C. and the hydrogen pressure is maintained at about 2000 to about 3500 p.s.i.g. while the reaction mass is continuously agitated. After a time of about 0.5 to 5 hours, preferably about 1 to 2 hours, the heat is removed and the reaction mass allowed to cool after which it is filtered to remove catalyst, and flash distilled to remove excess water and volatiles. A vacuum distillation then gives the product 2–P in good yield.

While the amounts of reagents are not critical, it is generally desirable to operate within certain regions. The concentration of aqueous succinonitrile will generally be about 0.10 to about 0.50 mole per 100 grams of water. The catalyst as indicated is Raney cobalt and will generally be from about 0.5 to 10% by weight of succinonitrile solution, preferably between about 20 and about 40 grams per mole of succinonitrile. As indicated, the hydrogen pressure used in the process will be from about 2000 to about 3500 p.s.i.g. with about 2400 to about 3000 p.s.i.g. being preferred. Time of reaction will most preferably be about 1 hour. As indicated, it is important that the temperature of reaction be maintained within about 250° to about 300° C. in order that optimum yields be achieved.

In order to further illustrate the invention, the following examples are given:

EXAMPLE 1

A 300 cc. stainless steel rocking autoclave was charged with 0.25 mole of succinonitrile, 100 cc. of distilled water, 500 p.s.i.g. hydrogen, and 10 grams of Raney cobalt catalyst and heated to reaction temperature. Hydrogen gas was then introduced at constant pressure until all evidence of reaction ceases by the fact that hydrogen is no longer absorbed. The reaction products are then cooled and the aqueous products analyzed by nuclear magnetic resonance to determine the yield of 2–P. The following table indicates a number of runs and the results obtained:

TABLE

| Example No. | Temp. (° C.) | Hydrogen pressure (p.s.i.g.) | 2-P yield (mole percent) |
|---|---|---|---|
| 1 | 150 | 1,200 | 41.5 |
| 2 | 200 | 1,200 | 40.3 |
| 3 | 225 | 1,200 | 42.0 |
| 4 | 275 | 1,200 | 44.2 |
| 5 | 150 | 2,900 | 38.6 |
| 6 | 210 | 2,900 | 38.6 |
| 7 | 240 | 2,900 | 43.7 |
| 8 | 275 | 2,900 | 61.8 |
| 9 | 300 | 2,900 | 48.0 |

It is evident from Examples 1 to 4 in the above table that at pressures of about 1200 p.s.i.g., increasing the temperature of reaction shows no significant beneficial effect. Even at pressures of about 3000, little benefit is achieved by raising temperatures up to about 240° C. (Examples 5 to 7). However, under the conditions of the invention (Examples 8 and 9) significantly higher yields are obtained and Example 9 further illustrates the preferred reaction temperature of about 275° C. since yield decreased as the temperature increased to 300° C.

EXAMPLE 10

When Example 8 is repeated but with 5 grams of catalyst instead of 10 and at 3500 p.s.i.g., the yield of 2–P is 59.6 mole percent. When operating at the higher pressures (above about 3000 p.s.i.g.) the amount of catalyst should be reduced to no more than about 20 grams per mole of succinonitrile to avoid yield decrease due to hydrogenation of product under the more active conditions.

EXAMPLE 11

When Example 8 is repeated, but 0.5 mole of ammonia per mole of succinonitrile included, the yield of 2–P product is 42.2 mole percent in contrast to the 61.8% when the ammonia is absent.

It is obvious from the above that the process of the invention is dependent upon the absence of any added ammonia, temperature control within the range of about 250° to about 300° C. and pressures of about 2000 to about 3500 where maximum yield of 2–P products is obtained.

The invention claimed is:

1. A process for preparing 2-pyrrolidinone which comprises reacting succinonitrile in an aqueous solution and in the absence of added ammonia with hydrogen in the presence of Raney cobalt catalyst at a temperature from about 250° to 300° C. and a hydrogen pressure of from about 2000 to about 3500 p.s.i.g., the amount of catalyst being between about 20 and about 40 grams per mole of succinonitrile and the time of reaction being between about 0.5 and 5 hours.

2. A process as in claim 1 where temperature is about 275° C. and pressure is about 3000 p.s.i.g.

3. A process as in claim 2 where catalyst loading is about 40 grams per mole of succinonitrile.

References Cited

UNITED STATES PATENTS 3,644,402   2/1972   Takagi et al. ____ 260—326.5 FN

JOSEPH A. NARCAVAGE, Primary Examiner